May 12, 1942.    M. C. HERGET    2,283,139
CONTROL MECHANISM
Filed Sept. 5, 1941
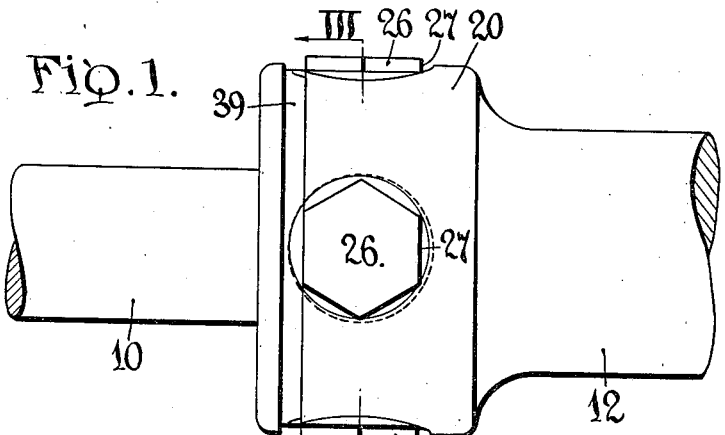
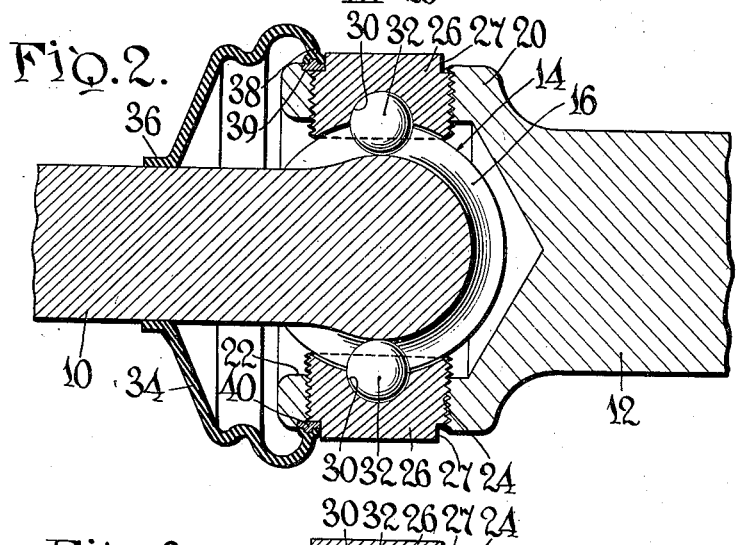
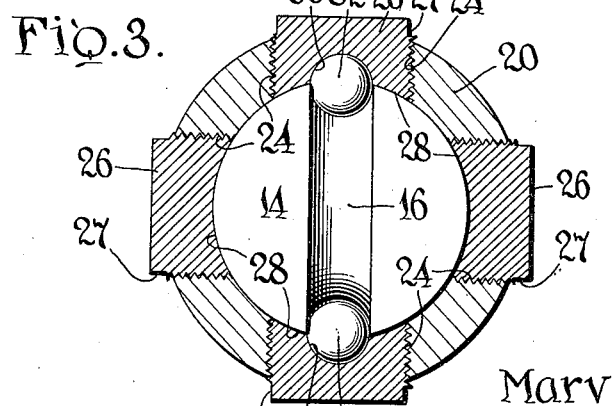
INVENTOR
Marvin C. Herget,
BY
Beau, Brooks, Buckley & Beau.
ATTORNEYS Patented May 12, 1942

2,283,139

UNITED STATES PATENT OFFICE 2,283,139

CONTROL MECHANISM

Marvin C. Herget, Williamsville, N. Y., assignor to Bell Aircraft Corporation, Buffalo, N. Y.

Application September 5, 1941, Serial No. 409,695

8 Claims. (Cl. 64—7)

This invention relates to control devices such as control movement transmitters or the like, and more particularly to improvements in universal joint mechanisms for otherwise rigid shafting for power and/or movement transmitting purposes.

One of the objects of the invention is to provide an improved universal joint of the torque and thrust transmitting type. Another object of the invention is to provide an improved mechanism of the character described which is adapted to be manufactured through use of relatively simple and inexpensive shop practices. Another object of the invention is to provide a device of the character described in which worn parts thereof are susceptible of replacement in an improved manner. Another object of the invention is to provide a device of the character described which is adapted to be adjusted as may be required to compensate for wear of portions thereof, in an improved manner.

In the drawing:

Fig. 1 is a fragmentary elevation of a pair of control shafts joined by a device of the invention;

Fig. 2 is a vertical longitudinal section thereof, showing a soil guard accessory device mounted thereon; and Fig. 3 is a transverse section taken substantially along line III—III of Fig. 1.

The drawing illustrates the invention in conjunction with a pair of shafts 10 and 12 which are arranged in driver-driven relationship for control movement transmitting purposes. The shaft 10 is formed at its end into the form of a spherical knob as indicated at 14, and the knob portion 14 is peripherally grooved as at 16 in the plane extending centrally and longitudinally of the shaft 10.

The shaft 12 is provided with an enlarged end socket portion 20 which is interiorly bored as at 22 so as to freely accommodate movement of the knob portion 14 of the shaft 10 thereinto. The socket portion 20 of the shaft 12 is bored and tapped as indicated at 24 at four positions equally spaced circumferentially thereof in such manner as to be adapted to engage in screw-threaded mounted relation thereon a plurality of bearing blocks 26. The blocks 26 are generally of cylindrical form and threaded at their side wall portions so as to be adapted to be mounted in axially adjustable relation within the bored and tapped portions 24 of the socket member 20, as illustrated in Figs. 2 and 3. At their outer ends the bearing blocks 26 are preferably shaped so as to be conveniently engaged by a wrench or other suitable tool as by having their side portions flattened as at 27, and at their inner end portions the bearing blocks 26 are concave-faced as indicated at 28 so as to complement and engage adjacent portions of the knob portion 14 of the shaft 10 in slide fitting bearing relation thereagainst. Thus, the bearing blocks 26 function to fix the shaft 10 relative to the shaft 12 in directions longitudinally thereof without interfering with free universal or swivelling movement therebetween about the center of the spherical knob 14. Also, it will be understood that subsequent to initial assembly of the device and upon wearing of the face portions 28 of the bearing blocks or of the knob portion 14 of the shaft 10, the bearing blocks 26 may be threaded more deeply into the socket portion 20 of the shaft 12 to compensate for such wear and to reengage the knob portion 14 of the shaft 10 in snug-fitting fashion.

The two bearing blocks 26—26 which are arranged adjacent the grooved portion 16 of the shaft 10 are socketed as at 30 so as to be adapted to mount in partially embedded relation therein corresponding of a pair of ball bearings 32—32 in such manner that the ball bearings 32—32 extend also into close fitting relation with respect to the grooved portion 16 of the knob 14, and it will be understood that the elements of the mechanism will be so proportioned and arranged that the ball bearings 32—32 will thereby be adapted to lock the shaft 12 against rotation relative to the shaft 10 about axes extending longitudinally of the shaft members. However, due to the peripherally grooved formation at 16, the ball bearings 32—32 will be free to roll peripherally of the knob 14 and thus the shafts 10 and 12 are free to move into any desired angular axial relationships.

Preferably, a soil guard will be provided in the form of a flexible cuff as illustrated at 34; the cuff having an end portion 36 arranged in tight fitting relation about the shaft 10 and its other end portion 38 being arranged in tight fitting relation with respect to a grooved portion 39 of the socket member 20. Preferably, the end portion 38 of the cuff member 34 will be reinforced by a spring metal split ring 40 which is so shaped as to engage within the grooved portion 39 of the socket member so as to hold the cuff against accidental displacement therefrom. The ring member 40 may thus be conveniently arranged so as to pair laterally against corresponding of the flattened face portions 27 of the bearing blocks 26 so as to function simultaneously as a lock against accidental rotation of the bearing blocks 26 with respect to the socket member 20 subsequent to final assembly of the device. Thus, the soil guard device functions simultaneously to keep the interior bearing surfaces of the device clear of external soilage and to prevent the bearing blocks 26 from becoming accidently displaced from preferred adjusted positions.

It will be understood that the invention provides a simple and rugged mechanism comprising parts all of which are adapted to be manufactured in accord with economical shop practices and which may be readily assembled by simply placing the coacting shaft portions in proper juxtaposition, and then disposing the ball bearings 32—32 within the grooved portion of the knob 14, and then screwing the bearing blocks 26 into the socket member 20 so as to engage the bearings 32—32 and the knob portion 14 as explained hereinabove. The cuff 34 may then be applied as explained, whereupon the device becomes an integral assembled unit.

Although only one form of the invention has been shown and described in detail it will be apparent to those skilled in the art that the invention is not so limited but that various changes may be made therein without departing from the spirit of the invention or the scope of the appended claims.

I claim:

1. In combination, a pair of transmission shafts arranged in end-to-end relation, one of said shafts having its end portion ball-shaped and grooved peripherally thereof, the other of said shafts having its end portion socket-shaped to substantially enclose said ball-shaped shaft portion, said socket-shaped shaft portion being provided with a plurality of bearing blocks inserted therewithin and spaced circumferentially thereof for bearing contact upon said ball-shaped portion, one of said bearing blocks having a key member extending therefrom for engagement with the grooved portion of said ball-shaped shaft portion to fix said shaft members against relative axial rotation, said bearing blocks being adjustable upon said shaft socket portion for adjusted bearing connection relative to said ball-shaped shaft portion.

2. In combination, a pair of transmission shafts arranged in end-to-end relation, one of said shafts having its end portion ball-shaped and grooved peripherally thereof, the other of said shafts having its end portion socket-shaped to substantially enclose said ball-shaped shaft portion, said socket-shaped portion being provided with a plurality of bearing blocks spaced circumferentially thereof and having concave-shaped inner faces for bearing contacts upon said ball-shaped portion, one of said bearing blocks having a key member extending therefrom for engagement with the grooved portion of said ball-shaped portion to fix said shaft members against relative axial rotation, said bearing blocks being adjustable upon said socket portion for adjusted bearing relative to said ball-shaped portion.

3. In combination, a pair of transmission shafts arranged in end-to-end relation, one of said shafts having its end portion ball-shaped and grooved peripherally thereof, the other of said shafts having its portion socket-shaped to substantially enclose said ball-shaped shaft portion, said socket shaped portion being provided with a plurality of bearing blocks spaced circumferentially thereof and having concave-faced inner end portions for complementing said ball-shaped portion in bearing contact relation therewith, a pair of said bearing blocks at diametrically opposed positions having key members extending therefrom into engagement with the grooved portion of said ball-shaped portion to fix said shaft members against relative axial rotation, said bearing blocks being adjustable upon said socket portion in directions radially of the geometric center of said ball-shaped shaft portion.

4. In combination, a pair of transmission shafts arranged in end-to-end relation, one of said shafts having its end portion ball-shaped and grooved peripherally thereof, the other of said shafts having its end portion socket-shaped to substantially enclose said ball-shaped shaft portion, said socket shaped portion being provided with a plurality of bearing blocks spaced circumferentially thereof and having concave-faced inner end portions for complementing said ball-shaped portion in bearing contact relation therewith, a pair of said bearing blocks at diametrically opposed positions having key members extending therefrom into engagement with the grooved portion of said ball-shaped portion to fix said shaft members against relative axial rotation mounted by means of screw thread devices upon said socket portion so as to be adjustable in directions radially of the geometric center of said ball-shaped shaft portion.

5. In combination, a ball member and a socket member each having means connected thereto for power transmission purposes, said ball member being grooved peripherally thereof and substantially enclosed by said socket member, said socket member having concave faced bearing members mounted thereon and extending therewithin into swivelling engagement with said ball member, and key means mounted upon said bearing members and extending into the grooved portion of said ball member, said bearing members being adjustable upon said socket member for adjusted bearing connection relative to said ball member.

6. A universal joint device comprising, in combination, a ball member and a socket member each having means connected thereto for power transmission purposes, said ball member being grooved peripherally thereof and substantially enclosed by said socket member, said socket member having concave faced bearing members mounted thereon by screw thread mounting devices and extending therewithin into swivelling engagement at their concave face portions with said ball member, and key means extending into the grooved portion of said ball member, said bearing means being adjustable upon said screw thread mounting devices for adjusted bearing connection relative to said ball member.

7. A universal joint device comprising, in combination, a ball member and a socket member each having means connected thereto for power transmission purposes, said ball member being grooved peripherally thereof and substantially enclosed by said socket member, said socket member having concave faced bearing members mounted thereon by screw thread mounting devices and extending therewithin into swivelling engagement at their concave face portions with said ball member, and key means extending into the grooved portion of said ball member, said bearing means being adjustable upon said screw thread mounting devices for adjusted bearing connection relative to said ball member, and a soil guard mounted to extend about the open face portion of said socket member and having an end rim portion embracing said socket member and engaging said screw thread mounting devices to lock the latter against accidental movement thereof.

8. In combination, a pair of transmission shafts arranged in end-to-end relation, one of said shafts having its end portion ball-shaped and grooved peripherally thereof, the other of said shafts having its end portion socket-shaped to substantially enclose said ball-shaped shaft portion, said socket shaped portion being provided with a plurality of bearing block spaced circumferentially thereof and having concave-faced inner end portions for complementing said ball-shaped portion in bearing contact relation therewith, a pair of said bearing blocks at diametrically opposed positions having key members extending therefrom into engagement with the grooved portion of said ball-shaped portion to fix said shaft members against relative axial rotation mounted by means of screw thread devices upon said socket portion so as to be adjustable in directions radially of the geometric center of said ball-shaped shaft portion upon screw-threading rotation thereof, and a soil guard comprising a cuff having an end portion engaging about said socket portion and in registry with said bearing blocks so as to prevent unintended screw-thread rotation of the latter.

MARVIN C. HERGET.